United States Patent [19]
Racca

[11] 3,943,839
[45] Mar. 16, 1976

[54] COOKING APPARATUS

[75] Inventor: Wilvin W. Racca, Baton Rouge, La.

[73] Assignee: Franklin Press, Inc., Baton Rouge, La. ; a part interest

[22] Filed: May 29, 1974

[21] Appl. No.: 474,224

[52] U.S. Cl..................... 99/407; 99/443 R; 99/450
[51] Int. Cl.² ..................... A47J 27/21; A47J 33/00
[58] Field of Search.............. 99/404, 403, 409–410, 99/411, 414, 443, 446, 450; 280/43.2, 43.24, 150.5; 212/145; 126/25

[56] References Cited
UNITED STATES PATENTS

| | | | |
|---|---|---|---|
| 1,040,451 | 10/1912 | Stockton | 280/43.24 X |
| 1,394,612 | 10/1921 | Dernell | 99/414 |
| 1,454,856 | 5/1923 | O'Brien | 99/409 |
| 2,470,446 | 5/1949 | Rankin | 99/404 |
| 2,519,364 | 8/1950 | Fredholm | 280/150.5 X |
| 3,286,620 | 11/1966 | Brown | 99/446 |
| 3,355,136 | 11/1967 | Staples | 280/150.5 X |
| 3,410,199 | 11/1968 | Quednau | 99/403 |
| 3,642,242 | 2/1972 | Danekas | 280/150.5 X |

FOREIGN PATENTS OR APPLICATIONS

| | | | |
|---|---|---|---|
| 347,714 | 1/1922 | Germany | 99/414 |

*Primary Examiner*—Robert W. Jenkins
*Assistant Examiner*—Arthur O. Henderson
*Attorney, Agent, or Firm*—Robert G. McMorrow

[57] ABSTRACT

A frame supports a burner box incorporating heating means and having a liquid filled boiler section thereabove. The frame further has an overhead beam with a movable trolley from which a mesh cooker is suspended for immersion into the heated liquid and for removal therefrom.

The apparatus is preferably mobile and is supplied with ground wheels and stabilizing means.

1 Claim, 5 Drawing Figures

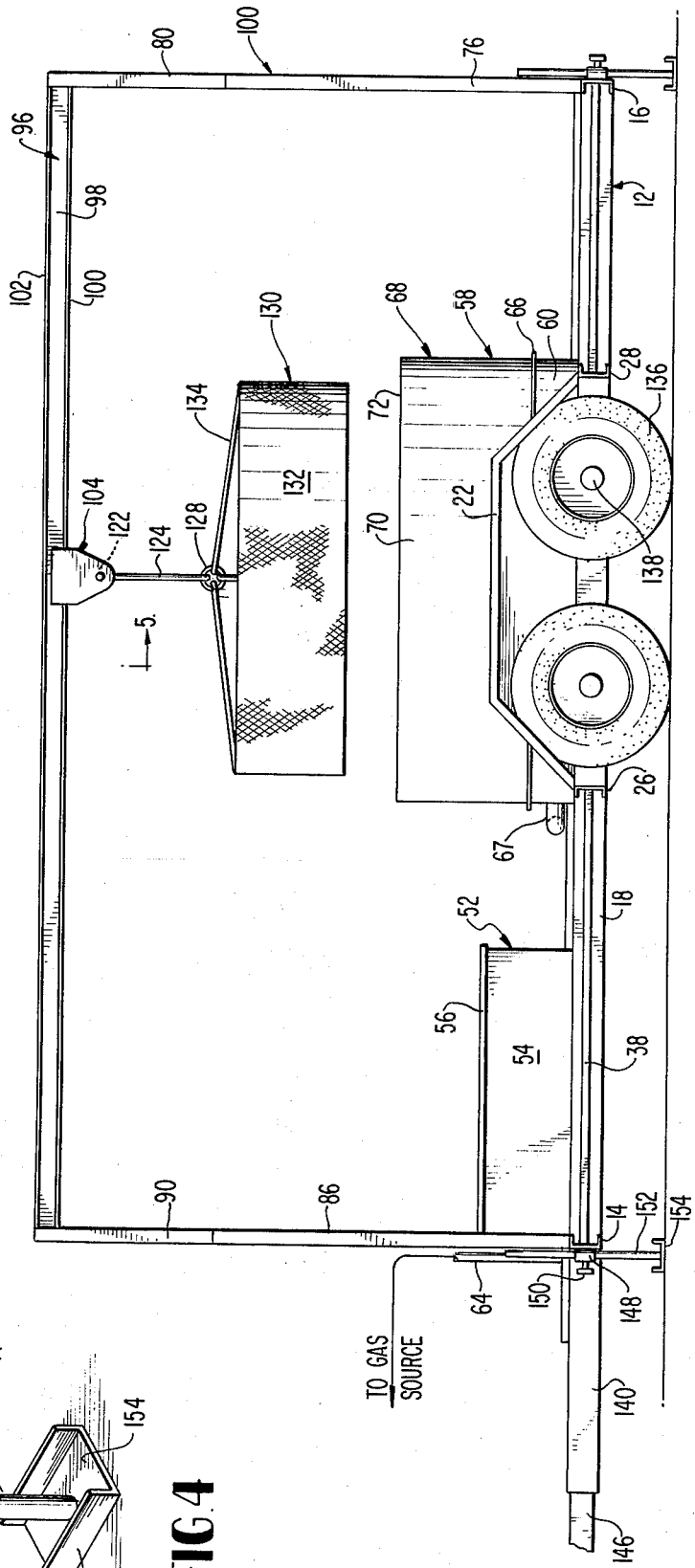
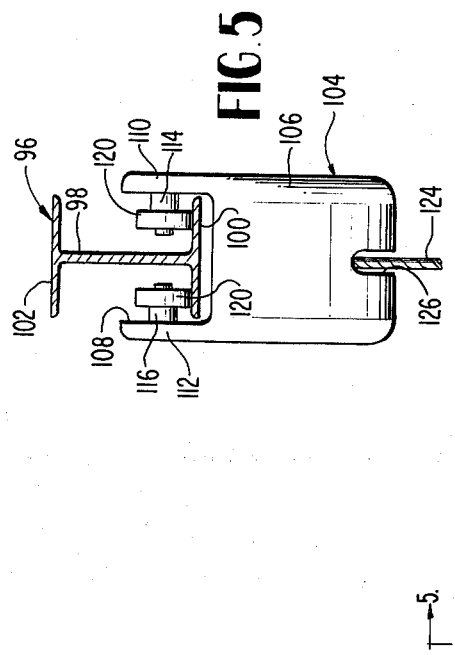
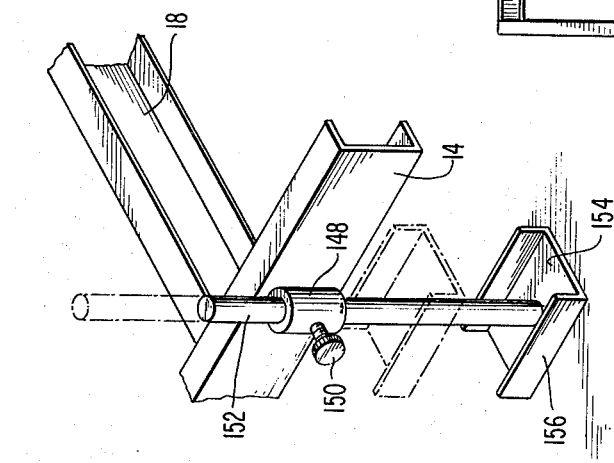

COOKING APPARATUS

BACKGROUND OF THE INVENTION

1. Field of the Invention

This invention pertains to apparatus used in the preparation of boiled foods, specifically to an improved cooker particularly useful in boiling substantial quantities of seafood and like materials for outdoor gatherings.

2. Statement of Prior Art

The cooking technique of temporary immersion of foods in boiling liquids has long been known. Also, various mobile apparatus for cooking has been previously proposed. Exemplary of the patented art on this subject are the below listed U.S. patents:

| Patent No. | Patentee | Issued |
|---|---|---|
| 275,516 | E. M. Perhacs & F. Neumuller | April 10, 1883 |
| 887,940 | L. Hohnke | May 19, 1908 |
| 981,608 | G. Beyer | Jan. 17, 1911 |
| 1,011,080 | J. Rau | December 5, 1911 |
| 1,127,064 | W. A. Mills | February 2, 1915 |
| 1,263,804 | A. S. Rice | April 23, 1918 |
| 1,263,805 | A. S. Rice | April 23, 1918 |
| 1,285,304 | W. C. Merrill | November 19, 1918 |
| 1,331,241 | J. W. Converse | February 17, 1920 |
| 1,335,941 | V. De Carlo | April 6, 1920 |
| 2,948,798 | W. H. C. Ness | August 9, 1960 |

SUMMARY OF THE INVENTION

The present invention provides a large volume boiler for seafood and similar food substances which is particularly applicable to the preparation of such foods at large gatherings. The mobility of the apparatus adapts it for use at picnics and the like, and the frame of the unit is supplied with ground engaging leveling and stabilizing means whereby the apparatus is usable in irregular terrain.

The apparatus provides for vertical movement of an open grid cooker into and out of the boiling medium, and for forward and aft movement of the cooker, whereby the contents of the cooker may be placed within or removed from the boiling medium safely.

A cooking arrangement in accordance with the foregoing permits maintenance of the boiling mediium at cooking temperatures at all times thereby avoiding delays for re-heating occasioned when direct access to the medium is necessary. This in turn results in the capability of the apparatus to produce substantial quantities of cooked foods in minimum time.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a side elevational view of mobile cooking apparatus constructed and assembled in accordance with the teachings of this invention;

FIG. 4 is an enlarged perspective view showing details of the leveling and stabilizing means of the invention; and FIG. 5 is an enlarged sectional view on line 5—5 of FIG. 1, looking in the direction of the arrows.

DESCRIPTION OF THE PREFERRED EMBODIMENT

Figure 2:
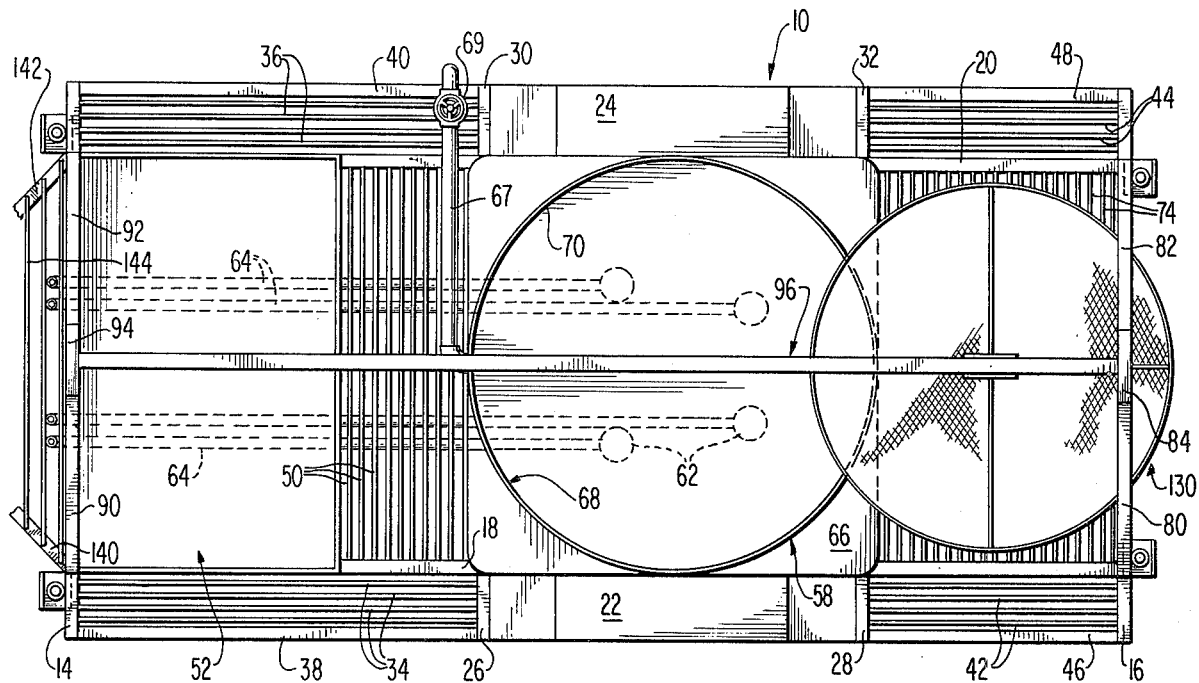
FIG. 2 is a top plan view thereof.
Figure 3:
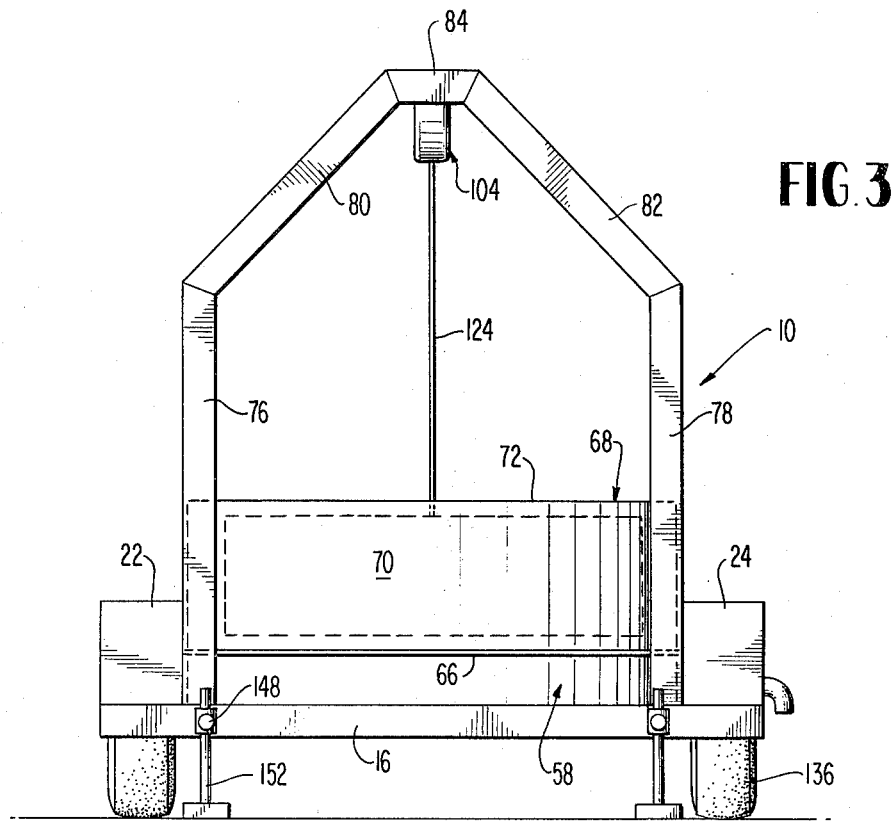
FIG. 3 is a rear elevational view showing the cooker in operating position.

The apparatus of this invention is generally identified in the drawing by reference numeral 10 and comprises a mobile apparatus of the trailer type adapted to be moved from place-to-place by a suitable prime mover. The apparatus 10 comprises an open horizontal frame 12 including a forward cross channel 14 and rear cross channel 16. The forward and rear cross channels are connected by elongated longitudinal frame channels 18 and 20 spaced inwardly from the outer extremities of the cross channels. Fenders 22 and 24 are secured to fender mounting channels 26, 28 and 30, 32 respectively, on either side of the frame.

A series of grate members 34 are mounted between the channel 26 and the forward cross channel 14, and similar grate members 36 are provided between the channels 14 and 30. An outer L form bar 38 and 40 is supplied as the outer grate member on each side of the frame. In like manner, aft of the fenders, grate members 42 extend between the channels 28 and 16, and grate members 44 connect the channels 16 and 32, each side having an outer L form bar, 46, 48, respectively. The grate members provide side platforms to enable operators of the apparatus to have convenient access to the components during cooking operations.

Internally of the side platforms, the frame is supplied with a series of grates 50 which extend between the longitudinal frame channels 18 and 20. Forward of these grates is a metallic storage box 52 comprising side walls 54 and a top rim 56. This container is employed to store materials prior to cooking, such as live seafoods, or for the temporary storage of materials after cooking.

Mounted on the frame side channels 18 and 20 aft of the grating 50 is a closed boiler 58 of dual compartment form. The boiler comprises a lower burner box 60 in which are positioned a plurality of heating components, preferably gas burners 62. Such burners are supplied with fuel through a series of conduits 64 which extend to a source as shown in FIG. 1. A central plate 66 provides a top for the burner box and a base for a liquid type boiler section 68 defined by a vertical annular wall 70 having and open top 72. The boiler section is adapted to contain a cooking medium for the materials to be cooked, such as suitably seasoned water or the like. Drainage of the boiler following use is accomplished through a pipe 67 having a valve 69 therein. A further series of grates 74 are fixedly secured between the frame side channels rearwardly of the boiler 58.

Extending vertically from the rear of the frame are upright structural members 76 and 78. Angle beams 80, 82 extend from the upper ends of the structural members toward one another and are interconnected by a horizontal cross brace 84, forming a vertical yoke assembly. An identical yoke is supplied at the forward end of the frame, comprising upright structural members 86, 88, angle beams 90, 92 and a brace 94. An elongated I beam 96, having a central vertical rib 98, a base 100 extending outwardly on each side of the rib, and a similar top bar 102 spans the distance between the braces 84 and 94 extending over the full extent of the longitudinal center line of the frame.

A trolley 104, FIG. 5, comprising a housing 106 has a slot 108 with side walls 110, 112 spaced sufficiently apart to admit the base 100 of the I beam therebetween. A series of stub axles 114, 116 extend inwardly from the side walls 110 and 112, and caster wheels 118, 120 are rotatably mounted thereon. Thus, the trolley is movable longitudinally on the I beam throughout substantially its full extent by contact of the caster wheels on the base 100. The housing contains a take-up reel 122 of conventional design from which a cable 124 extends through an opening 126 of the housing. The cable carries a ring 128 on its distal end.

A mesh cooker 130 comprising an open top basket 132 has a series of hanger cables 134 connected from its periphery to the ring 128. The cooker is dimensioned to fit within the confines of the boiler wall 70. Thus, the cooker and its contents may be immersed in the cooking medium by manual lowering of the cooker on its cables. When cooking time has expired, the basket may be raised and moved away from the heat source for serving. Alternatively, the contents may be retained in warm condition by retaining the basket in elevated position above the heated cooking medium in the position shown in FIG. 1 of the drawing.

The frame is, as indicated above, mobile, ground wheels 136 being secured on axles 138 suitably mounted in the side channels 18 and 20. A forward yoke assembly, including side bars 140, 142 and grate bars 144 is connected to a draft tongue 146 which is in turn connected to the prime mover when the device is being moved from place-to-place.

FIG. 4 discloses the details of a leveling and stabilizing assembly for the frame. At corner locations on the forward and rear channels 14 and 16, vertical sleeve members 148 are fixedly secured. The sleeves have clamp screws 150 extending thereinto, and elongated bars 152 are positioned for vertical adjustment in the sleeves. A plate 154, with rigidifying side flanges 156 is mounted on the lower end of each bar. When the unit is positioned for use, the clamp screws are loosened and the plates placed in suitable ground contacting positions. The screws are then tightened to stabilize the unit in selected level position.

I claim:
1. A mobile cooker comprising:
   a supporting frame having a substantially horizontal base;
   a burner box mounted on said base and having a side wall and a top plate;
   a boiler section comprising a vertical wall with an open top, the wall extending from the top plate of the burner box;
   an overhead beam located on said frame, the overhead beam being supported at its ends by vertical posts on said frame, over said boiler section, the overhead beam having a central rib and a base extending outwardly on each side of the rib;
   a trolley comprising a housing having spaced apart casters movably engaged on each of said bases of said beam;
   the trolley including a reel assembly;
   cable means extending from the reel assembly for raising and lowering an open frame cooker into and out of the boiler section;
   said open frame cooker being of mesh form and being movably suspended by said trolley on said overhead beam and being adapted for vertical alignment with the boiler section and for movement into and out of said section;
   the frame being provided with ground wheels;
   leveling means on said frame, adjustable for terrain contour and movable to upward storage positions for transit;
   the leveling means including a series of tubular sleeves secured in vertical positions on the frame; and
   means for heating the burner box, said means comprising a series of burners in the boiler section.

* * * * *